United States Patent
Mueller (10) Patent No.: US 7,562,492 B2
(45) Date of Patent: Jul. 21, 2009

(54) DEVICE AND METHOD FOR ARRANGING FLOWERS

(76) Inventor: Elaine Mueller, 311 San Carlos Rd., Minooka, IL (US) 60447

( * ) Notice: Subject to any disclaimer, the term of this patent is extended or adjusted under 35 U.S.C. 154(b) by 223 days.

(21) Appl. No.: 11/527,938

(22) Filed: Sep. 27, 2006

(65) Prior Publication Data

US 2008/0072485 A1 Mar. 27, 2008

(51) Int. Cl.
*A01G 5/00* (2006.01)
(52) U.S. Cl. .................................. 47/41.12; 47/41.13
(58) Field of Classification Search ................ 47/41.01, 47/41.12, 41.13, 41.14, 41.15, 39, 44; 434/93; 248/27.8; 33/562, 563, 565; 428/23, 24, 428/27
See application file for complete search history.

(56) References Cited

U.S. PATENT DOCUMENTS

| | | | | | |
|---|---|---|---|---|---|
| 4,600,612 | A | * | 7/1986 | Litwin et al. | 428/23 |
| 4,606,950 | A | * | 8/1986 | Corbet | 428/23 |
| 4,937,109 | A | * | 6/1990 | Lin | 428/23 |
| 5,733,612 | A | * | 3/1998 | Garry | 428/23 |
| 5,853,827 | A | * | 12/1998 | Wise et al. | 428/23 |

* cited by examiner

*Primary Examiner*—T. Nguyen
(74) *Attorney, Agent, or Firm*—Cherskov & Flaynik (57) ABSTRACT

A device and method 10 for arranging flowers include a flower chart 12 for determining stem lengths for primary and secondary flower 14 and 16, a flower holder 18 for securing end portions 20 of stems 22 of the primary and secondary flowers 14 and 16, and a stem template 24 for marking portions of the flower holder 18 such that the disposition of each primary and secondary flower 14 and 16 in a flower arrangement 26, is predetermined by inserting an end portion 20 of a stem 22 of each primary and secondary flower 14 and 16 into a cooperating marked portion of the flower holder 18.

12 Claims, 13 Drawing Sheets

DEVICE AND METHOD FOR ARRANGING FLOWERS

BACKGROUND OF THE INVENTION

1. Field of the Invention

The present invention relates generally to arranging flowers and, more particularly, to arranging a predetermined configuration that includes primary and secondary flowers with varying stem lengths and angular dispositions.

2. Background of the Prior Art

Professional and amateur florists arrange flowers pursuant to personal and customer requirements. Flower arrangements include many forms and flower types. Generally, flower arrangements have a primary or "favorite" flower supported by a secondary or "filler" flower that focus a viewers attention upon the primary flower. Further, flower arrangement forms are symmetrical including, but not limited to round and triangular configurations.

Prior art devices and methods arrange flowers by random manual insertion of primary and secondary flowers into a flower holder material such as Polystyrene. Professional florists are capable of creating flower arrangements via experience combined with imagination, although their floral creations may be less than artistic. Amateur florists usually create flower arrangements by trial an error. More specifically, the amateur obtains groups of their favorite flowers, then proceeds to assemble a flower arrangement by random insertion of selected flowers into the flower holder material. The amateur gives little consideration to flower stem length, flower positioning or flower arrangement symmetry. After assembling a portion of the flower arrangement, the amateur evaluates his or her work, then repositions selected flower, continues with the arrangement or removes all flower and starts anew.

A need exists for a device and method that selects varying stem lengths for primary and secondary flowers that configure a flower arrangement. Further, a need exists for a device and method that provide insertion marks upon a flower holder material, the insertion marks cooperating with a depiction direct a user as to where and at what angle to manually insert each end portion of the primary and secondary flower stems into the flower holder material.

SUMMARY OF THE INVENTION

It is a principle object of the present invention to provide a device and method for arranging flowers. A feature of the device is a flower chart. An advantage of the device is that varying stem lengths for each one of a plurality of primary and secondary flowers can be quickly selected.

Another object of the present invention is to provide a device and method that marks a flower holder that snugly and securely supports a plurality of primary and secondary flowers. A feature of the device and method is a stem template having a plurality of protuberances that penetrate and form recesses in the flower holder; the recesses ultimately receiving an end portion of a preselected flower stem therein. An advantage of the device and method is that primary and secondary flowers can be quickly inserted into the flower holder at preselected positions to ultimately configure a predetermined flower arrangement.

Yet another object of the present invention is to provide a device and method that illustrates the disposition of primary and secondary flowers in a flower holder. A feature of the device and method is a drawing depicting a flower pattern that configures a preselected flower arrangement. Another feature is a letter and number code in the drawing that identifies the relative position of each primary and secondary flower based upon stem length. An advantage of the device and method is that the disposition of each primary and secondary flower is depicted. Another advantage of the device and method is that the respective stem length for each primary and secondary flower is depicted.

Still another object of the present invention is to provide a device and method that illustrates the insertion location for each end portion of a respective primary and secondary flower into the flower holder. A feature of the device and method is a letter and number code marked upon a surface of a stem template; the letters and numbers correspond to the recesses formed in the flower holder by the stem template to provide insertion locations of primary and secondary flower stem end portions into the flower holder. An advantage of the device and method is that stem template letter and number code cooperates with the drawing depicting a flower pattern, to direct an individual to configure a predetermined flower arrangement comprised of preselected primary and secondary flowers of varying lengths with vertical and angular insertion orientations into the flower holder.

Briefly, the invention provides a method for arranging flowers, said method comprising the steps of selecting the size of a flower arrangement; selecting primary flowers for said flower arrangement; providing secondary flowers for said flower arrangement, said secondary flowers cooperating with said primary flowers to configure said flower arrangement; providing flower measuring means for determining stem lengths for said primary and secondary flowers; providing a flower holder for said primary and secondary flowers; marking portions of said flower holder for receipt of end portions of stems of said primary and secondary flowers; and inserting said end portions of said stems of said primary and secondary flowers into said marked portions of said flower holder, whereby said primary and secondary flowers are disposed to configure a predetermined flower arrangement.

The invention further provides a system for arranging preselected flowers in a flower holder comprising means for measuring stem lengths for primary flowers; means for measuring stem lengths for secondary flowers; means for securing end portions of stems of said primary and secondary flowers; and means for marking portions of said securing means, said marked portions ultimately receiving corresponding end portions of said stems of said primary and secondary flowers, whereby said primary and secondary flowers are arranged in a predetermined configuration.

The invention also provides a device for arranging flowers when inserted into a flower holder comprising a flower chart having designations thereupon that provide a plurality of flower stem cutting lengths corresponding to a plurality of selected flowers; and a stem template having means for marking portions of a flower holder such that the disposition of each flower in the flower arrangement is predetermined by inserting an end portion of a stem of a selected flower into a corresponding marked portion of the flower holder, whereby a plurality of selected flowers are disposed to configure a preselected flower arrangement.

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DESCRIPTION OF THE PREFERRED EMBODIMENT

Referring now to the drawings, a device and method for arranging flowers in accordance with the present invention is denoted as numeral 10. The device and method 10 includes a flower chart 12 for determining stem lengths for primary and secondary flowers 14 and 16, a flower holder 18 for securing end portions 20 of stems 22 of the primary and secondary flowers 14 and 16, and a stem template 24 or press for marking portions of the flower holder 18 such that the disposition of each primary and second flower 14 and 16 in a flower arrangement 26 is predetermined by inserting an end portion 20 of a stem 22 of the primary and secondary flowers 14 and 16 into a corresponding marked portion of the flower holder 18, whereby a plurality of primary and secondary flowers 14 and 16 are disposed to configure a preselected flower arrangement 26.

Figure 4:
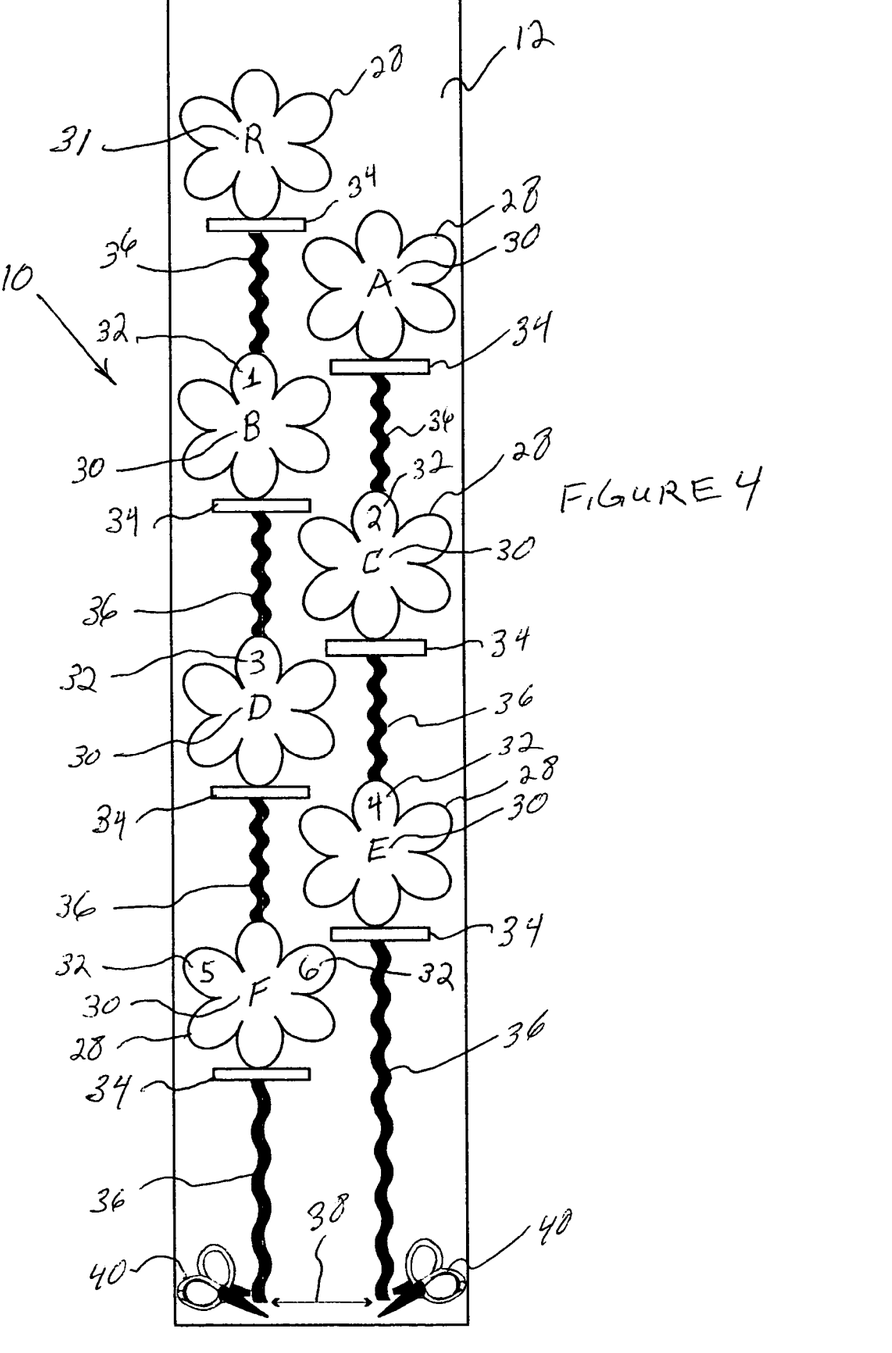
FIG. 4 is a front elevation view of a flower chart in accordance with the present invention.
Figure 5:
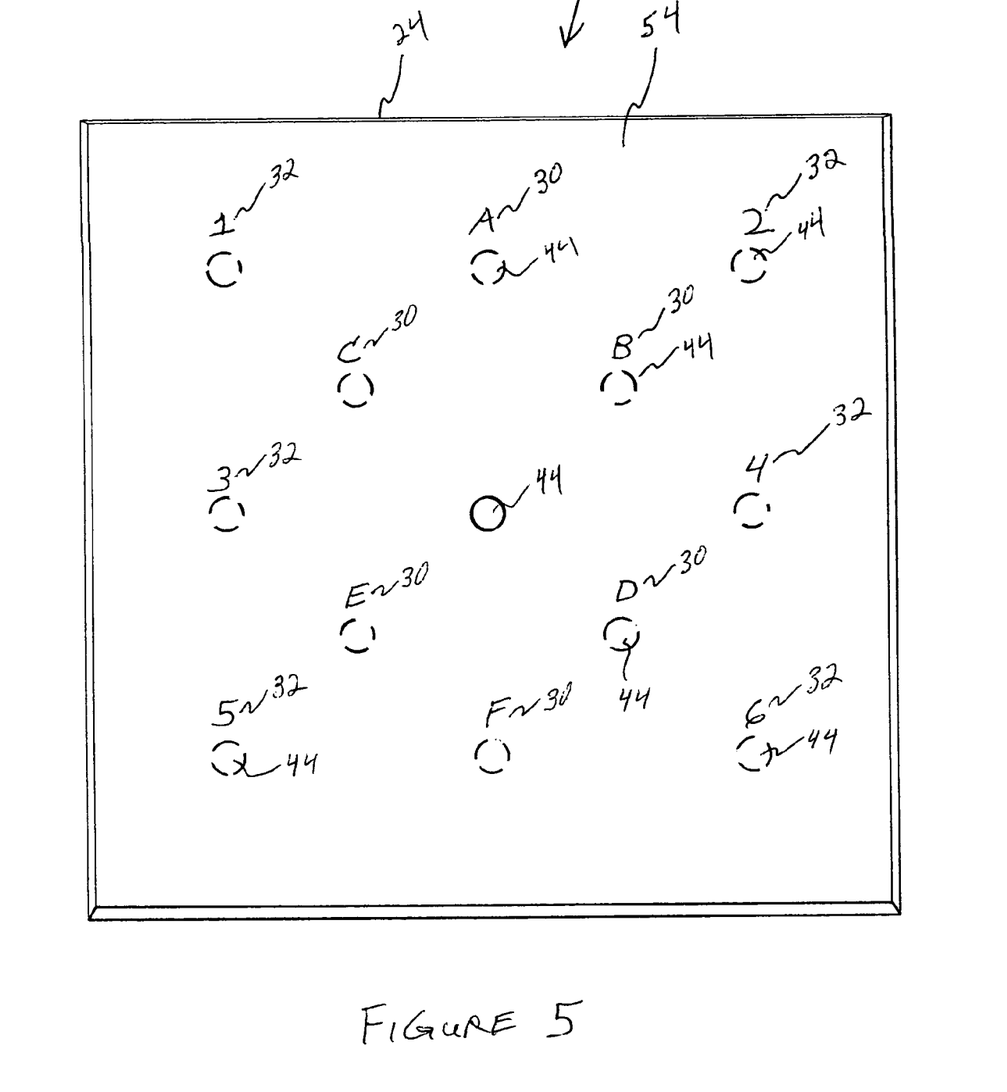
FIG. 5 is a front elevation view of a front surface of a stem template for the triangle pattern flower arrangement of FIG. 1, including phantom views of protuberances of a back surface in accordance with the present invention.
Figure 6:
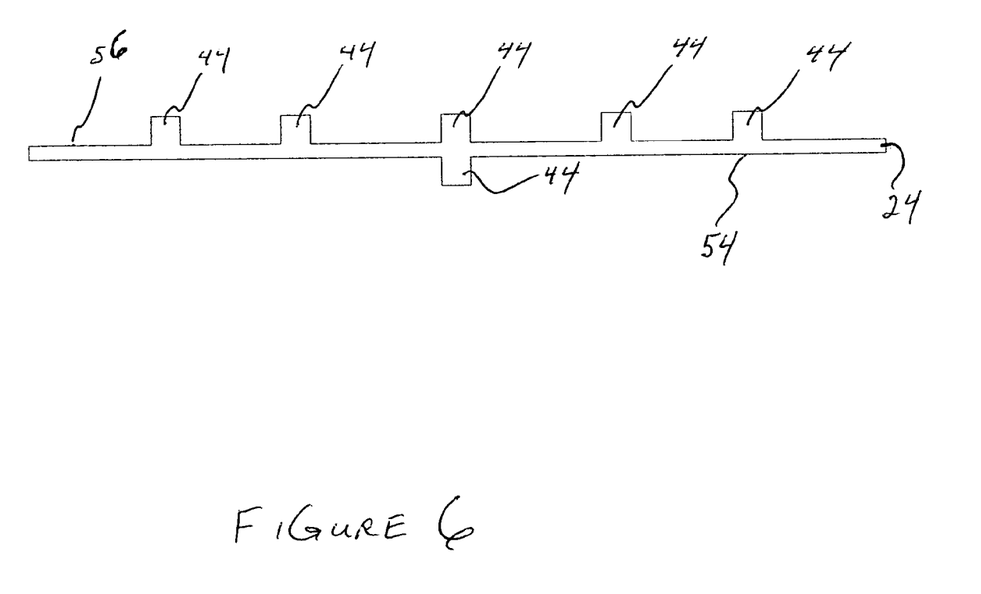
FIG. 6 is a top elevation view of the stem template of FIG. 5.
Figure 7:
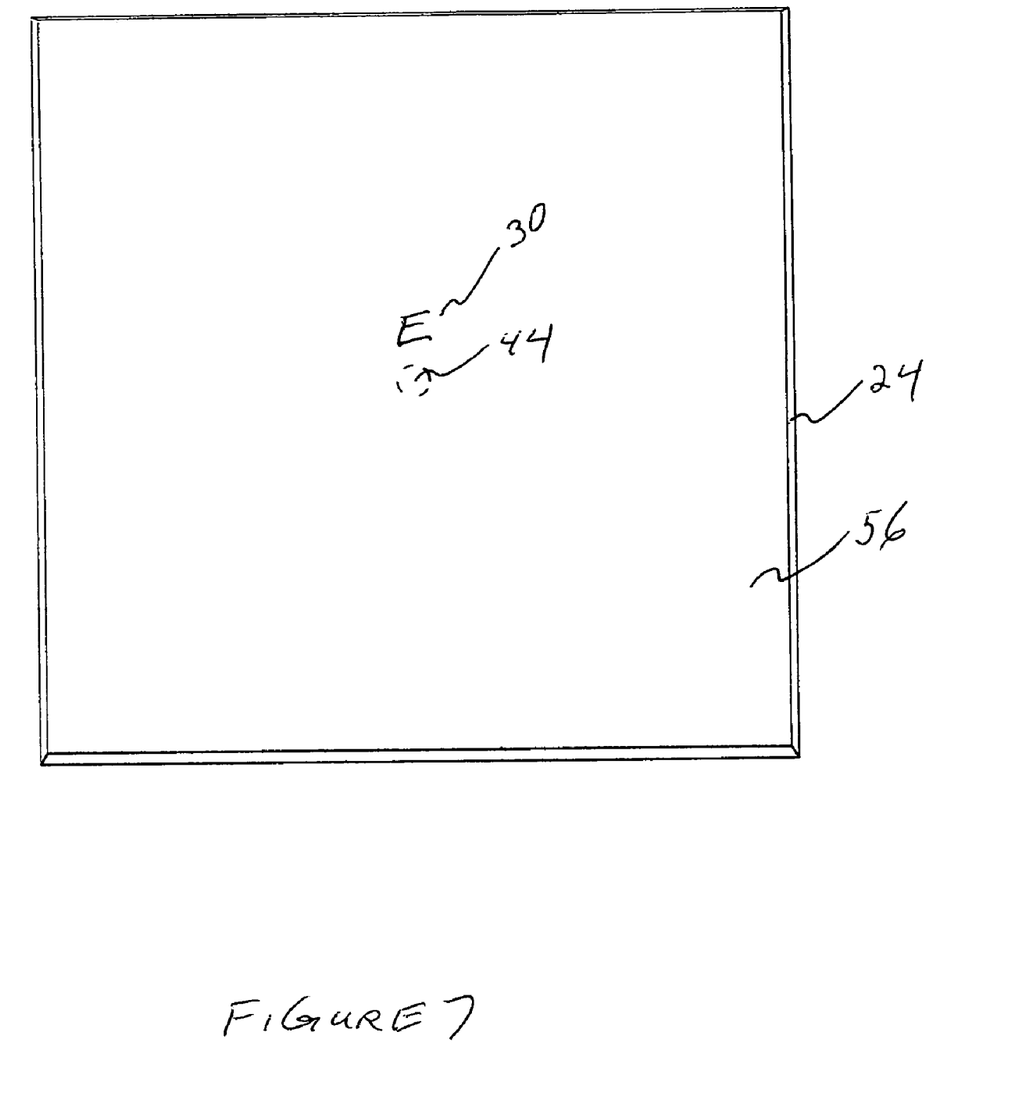
FIG. 7 is a back elevation view of the stem template of FIG. 5, including a phantom view of a protuberance of the front surface, but with the protuberances of the back surface removed in accordance with the present invention.

The flower chart 12 or flower stem 22 measuring means includes a plurality of flower designs 28 imprinted thereupon. The flower chart 12 is fabricated from plastic or similar water resistant, rigid material that allows flower designs 28 or varying colors to be printed upon at least one side. Imprinted on the flower designs 28 are letters 30 (A-F) corresponding to primary flowers 14 for the flower arrangement 26, and numbers 32 (1-6) corresponding to secondary flowers 16 for the flower arrangement 26. The flower chart 12 further includes a neck line 34 adjacent to each flower design 28, a flower stem line 36 extending from each neck line 34, and a cut line 38 that designates where scissors 40 or similar cutting tool will cut the stems 22 of primary and secondary flowers 14 and 16, after a preselected primary or secondary flower 14 and 16 is physically disposed upon a preselected flower design 28 on the flower chart 12. The preselected primary or secondary flower 14 and 16 is disposed upon the flower chart 12 such that a neck line 42 of the primary or secondary flower 14 and 16 aligns with the neck line 34 imprinted on the flower chart 12.

The longitudinal dimension of the flower chart 12 and the stem 22 lengths thereupon, correspond to the relative size of the preselected flower arrangement 26. More specifically, the size of flower arrangements 26 correspond to a predetermined location for the flower arrangement 26. The larger or "more open" the room, the larger the flower arrangement 26, and the greater the longitudinal dimension of the flower chart 12 and the stem 22 cutting lengths depicted thereon. At the top of the flower chart 12, is a flower design 28 with a letter 31 therein denoted as "R" that facilitates a stem cut length for a predetermined quantity (usually twelve) of long stem roses. Long stem roses are one of the most popular flowers used in flower arrangements 26. Thus, the "R" provides a user with quick cut capability to configure a preferred flower arrangement 26 with a popular flower; although, the user could select any favorite flower to dominate a flower arrangement 26 by placing the flower upon the "R" design 28, and cutting the stems 22 of one or more of the same flower to configure the preferred flower arrangement 26.

The stem template 24 or flower pattern member may be fabricated from a myriad of rigid, non-deformable materials including, but not limited to, aluminum, stainless steel and plastic. The template 24 includes a plurality of protuberances 44 extending from at least one side of the template 24. The protuberances 44 are disposed to forcibly configure a plurality of recesses 46 in the flower holder 18. The protuberances 44 ultimately penetrate the surface of the flower holder 18, thereby marking stem 22 insertion locations upon the flower holder 18 for the end portions 20 of the primary and secondary flower stems 22. The recesses 46 form a pattern that cooperate with a flower pattern drawing (see FIGS. 1-3) to ultimately form a preselected flower arrangement 26. The preselected flower arrangement 26 can be one of a myriad of configurations, including but not limited to triangular (FIG. 1) and round (FIGS. 2 and 3) patterns. The plurality of recesses 46 ultimately receive corresponding end portions 20 of the stems 22 of primary and secondary flowers 14 and 16, and cooperate with the preselected flower arrangement 26 pattern, such as the triangular pattern of FIG. 1, to arrange the primary and secondary flowers 14 and 16 in the predetermined configuration.

The flower holder 18 includes a myriad of rigid, deformable materials including but not limited to clay, Styrofoam and putty. The quantity of flower holder 18 material required for the flower arrangement 26 corresponds to the length of the flower stems 22 and the weight of the primary and secondary flowers 14 and 16. The longer the flower stem 22 and/or the heavier the flower; the greater the distance of insertion of the end portions 20 of the flowers into the flower holder 18, and/or the more rigid or greater quantity of the material required to form the flower holder 18 to maintain the relative positions of the primary and secondary flowers 14 and 16.

Figure 1:
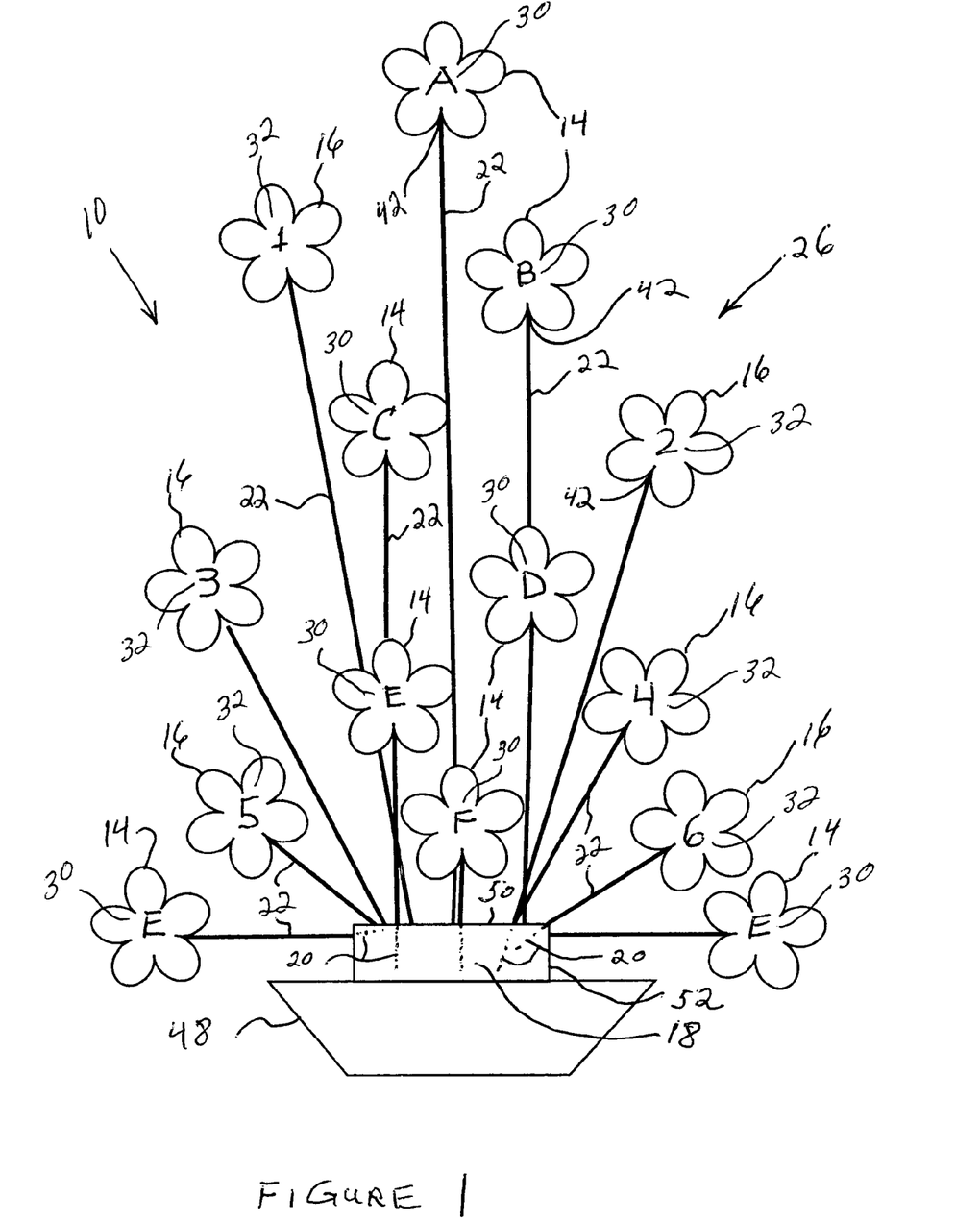
FIG. 1 is a front elevation view of a flower arrangement with a triangle pattern in accordance with the present invention.
Figure 2:
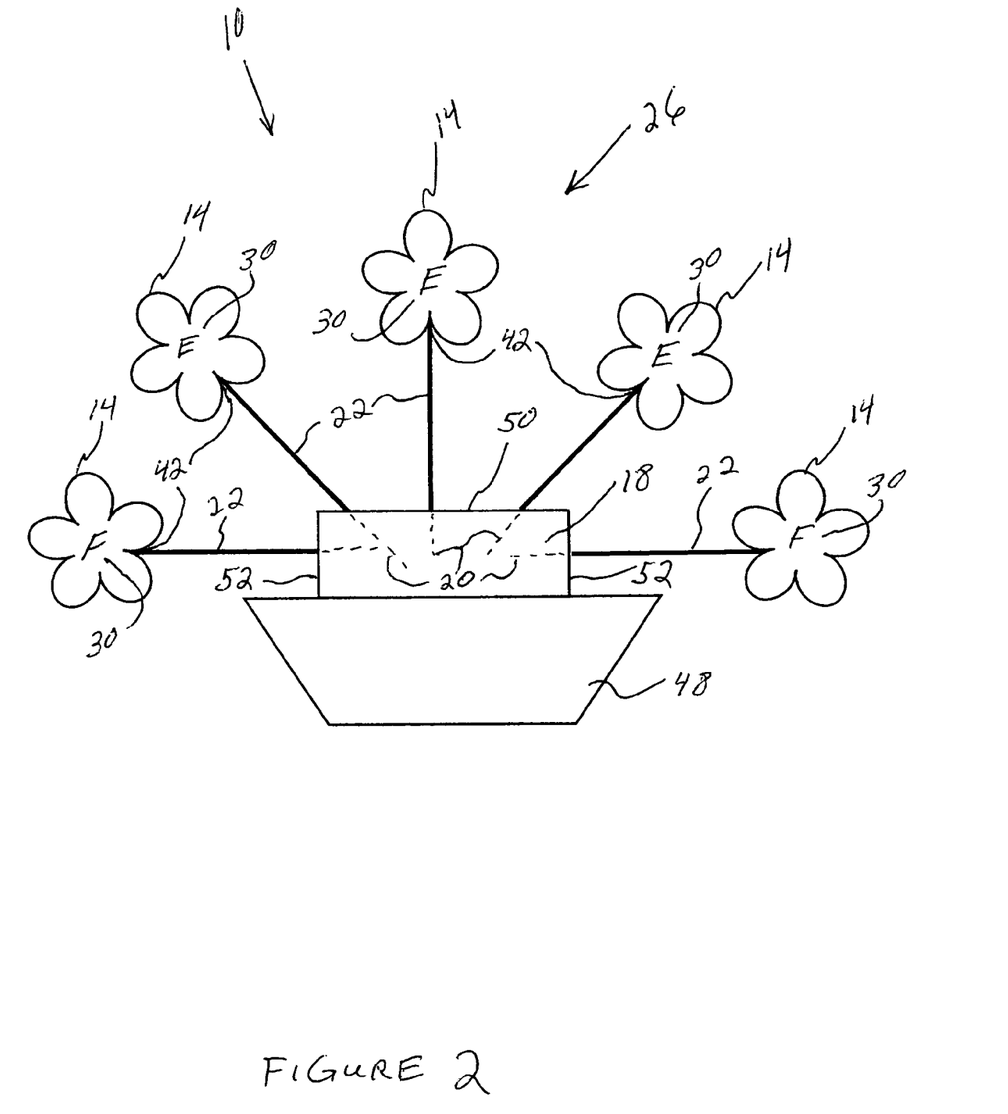
FIG. 2 is a side elevation view of a flower arrangement having a round pattern with a central flower and side flowers removed and a vase included for clarity of illustration in accordance with the present invention.
Figure 3:
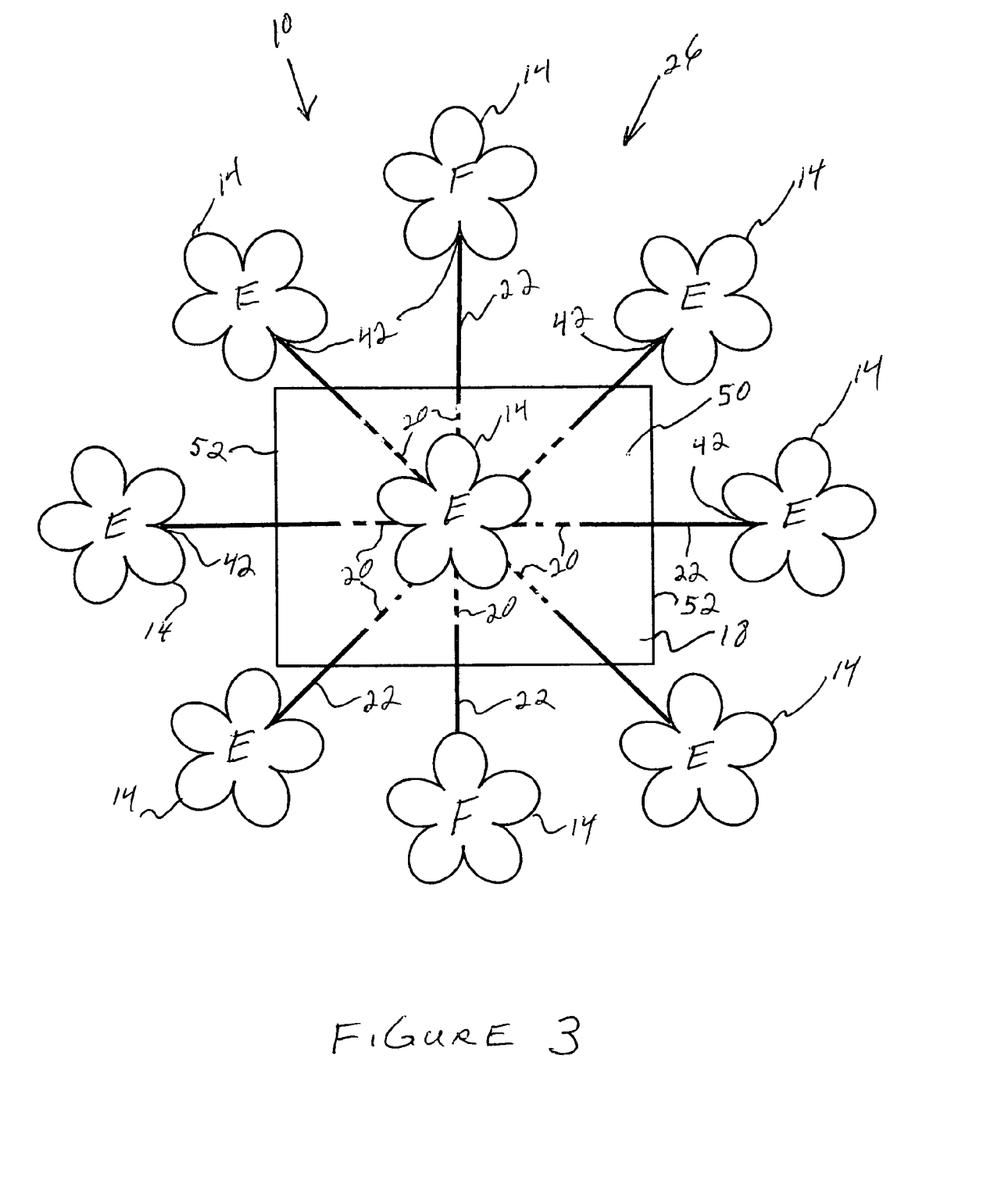
FIG. 3 is a top elevation view of the flower arrangement of FIG. 2, but with the central and side flowers included and the vase removed for clarity of illustration in accordance with the present invention.
Figure 8:
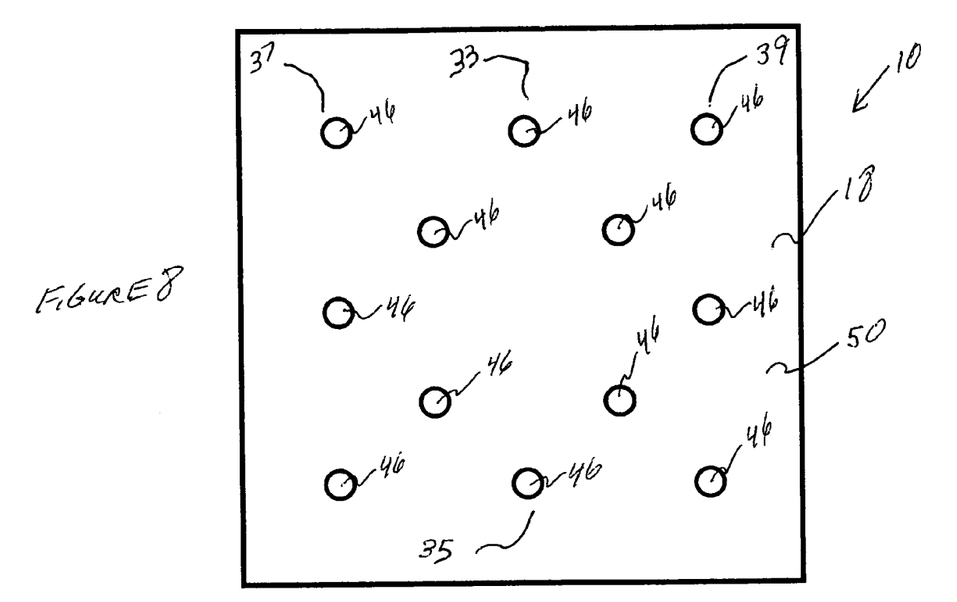
FIG. 8 is a top elevation view of a flower holder with recesses therein formed by a back surface of the stem template of FIG. 5 in accordance with the present invention.
Figure 9:
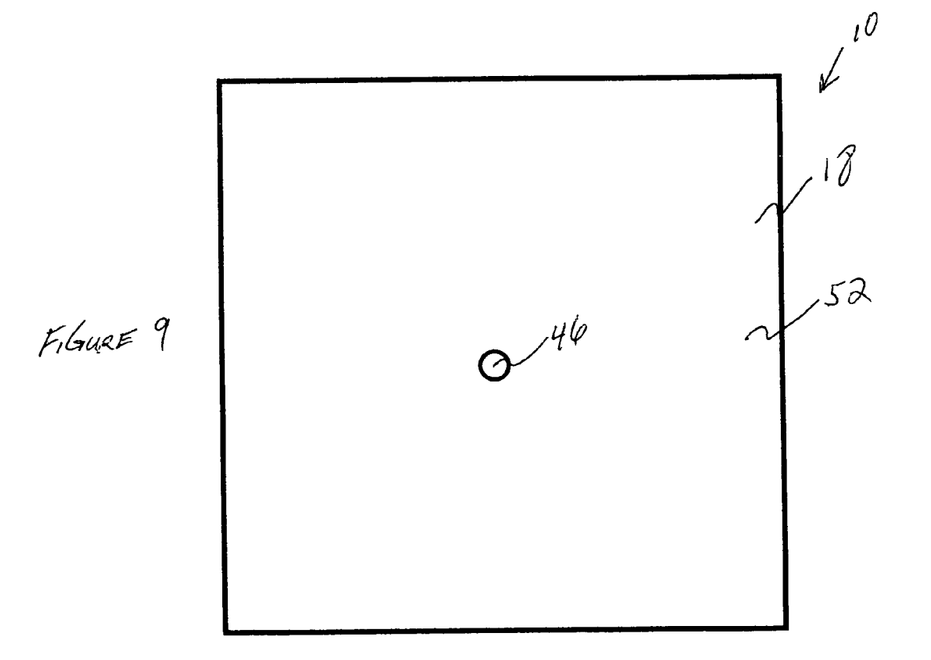
FIG. 9 is a side elevation view of the flower holder of FIG. 8 with one recess therein formed by a front surface of the stem template of FIG. 5 in accordance with the present invention.
Figure 10:
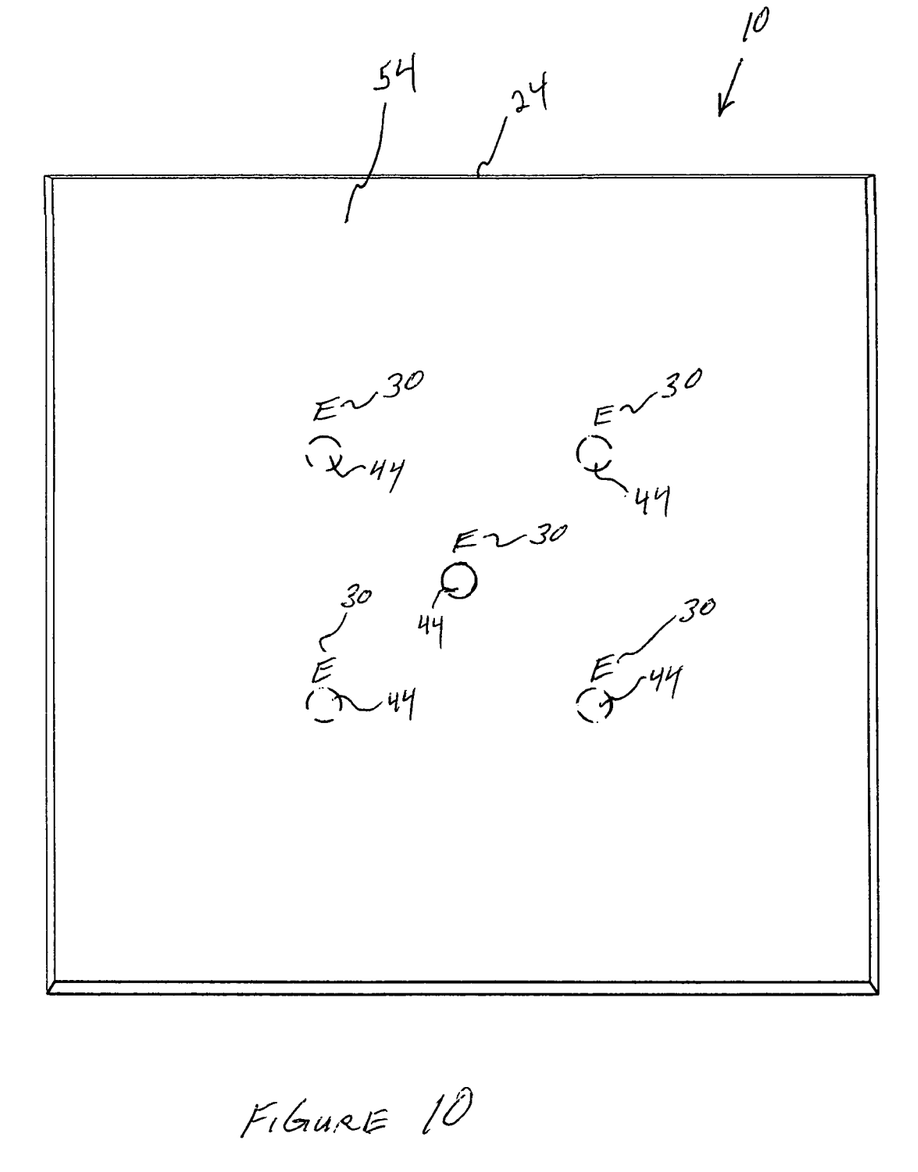
FIG. 10 is a front elevation view of a front surface of a stem template for the round pattern flower arrangement of FIG. 2, including phantom views of protuberances of a back surface in accordance with the present invention.
Figure 11:
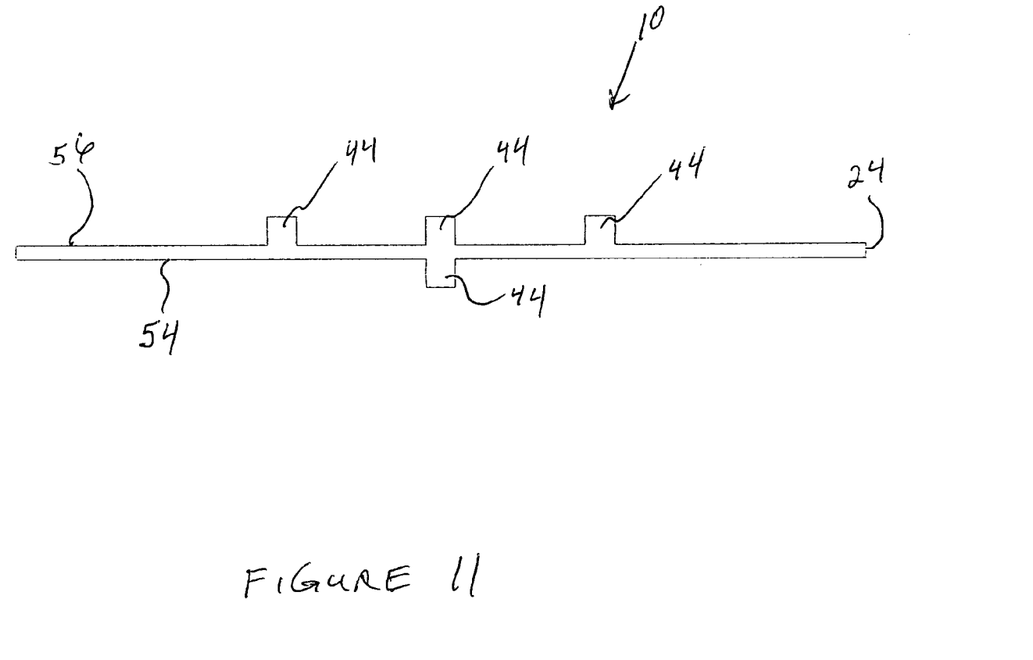
FIG. 11 is a top elevation view of the stem template of FIG. 8.
Figure 12:
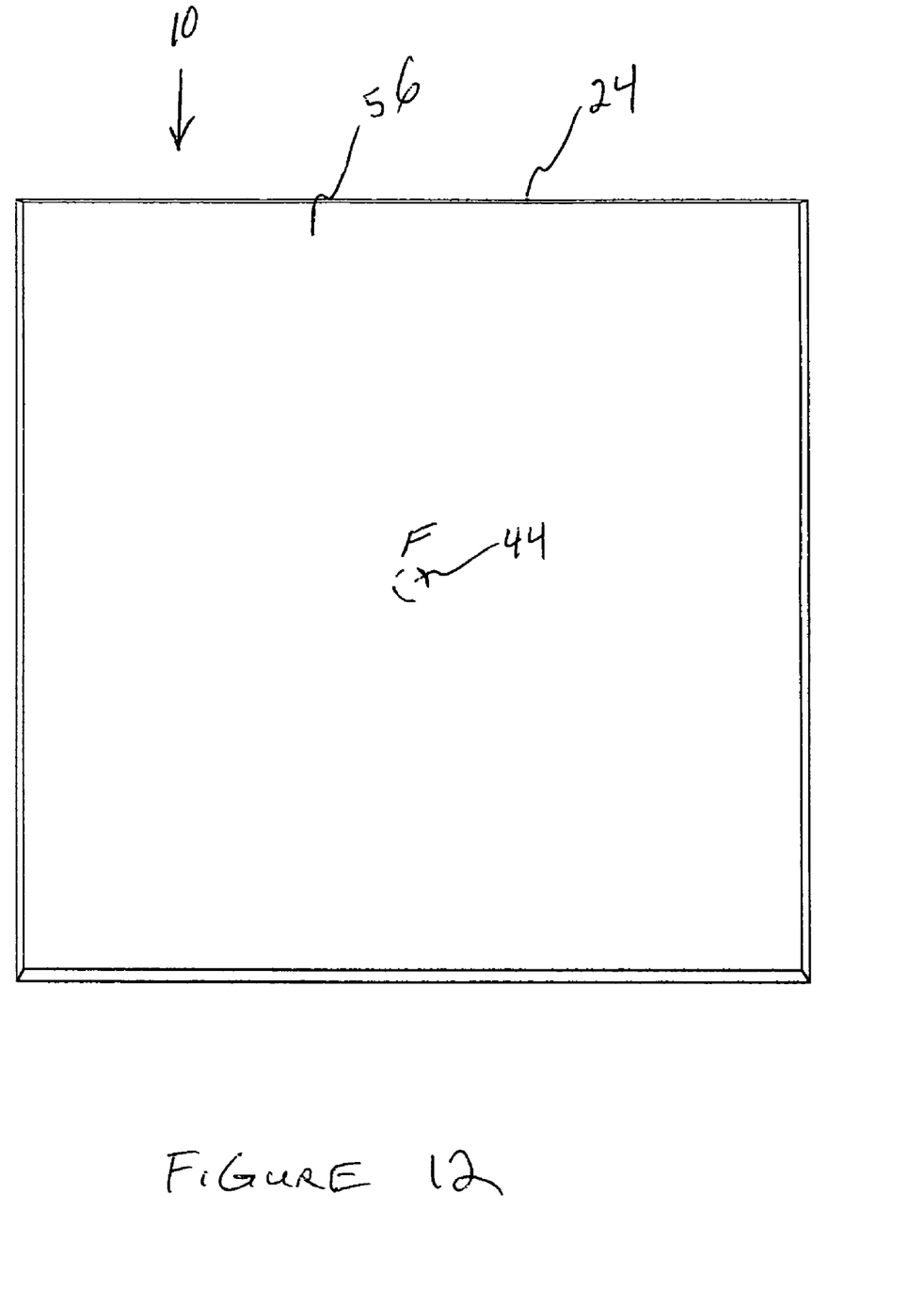
FIG. 12 is a back elevation view of the stem template of FIG. 8, including a phantom view of a protuberance of the front surface, but with the protuberances of the back surface removed in accordance with the present invention.
Figure 13:
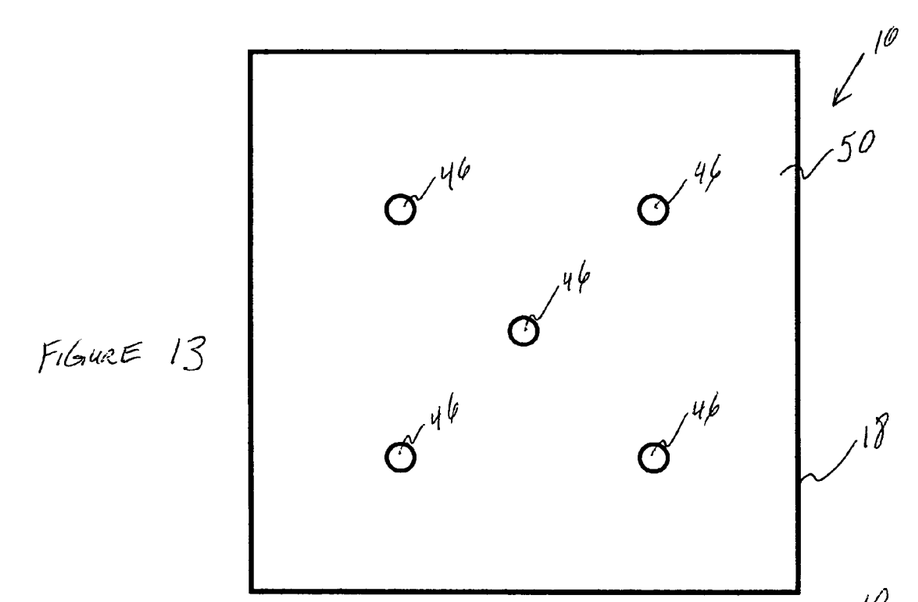
FIG. 13 is a top elevation view of a flower holder with recesses therein formed by a back surface of the stem template of FIG. 10 in accordance with the present invention.
Figure 14:
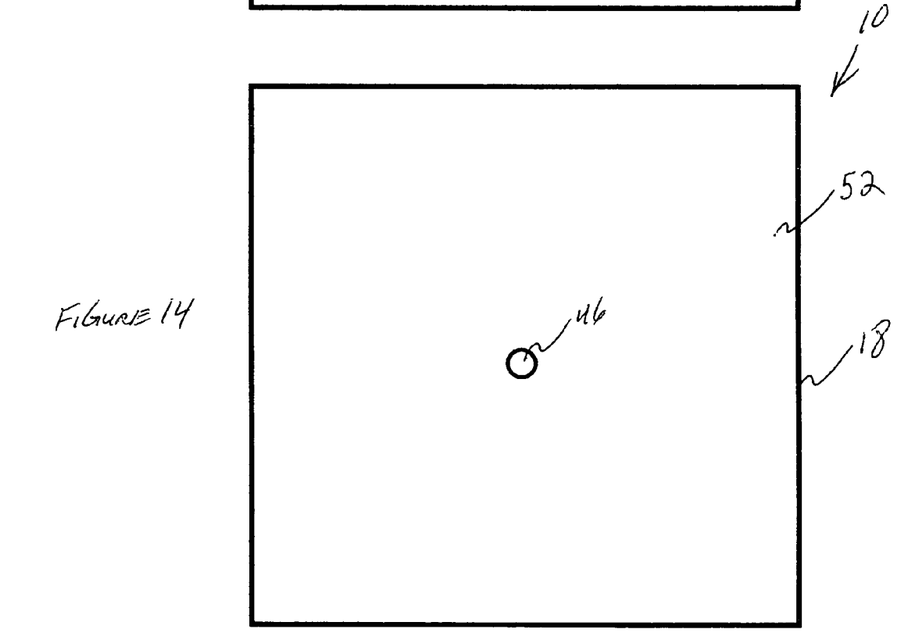
FIG. 14 is a side elevation view of the flower holder of FIG. 13 with one recess therein formed by a front surface of the stem template of FIG. 10 in accordance with the present invention.
Figure 15:
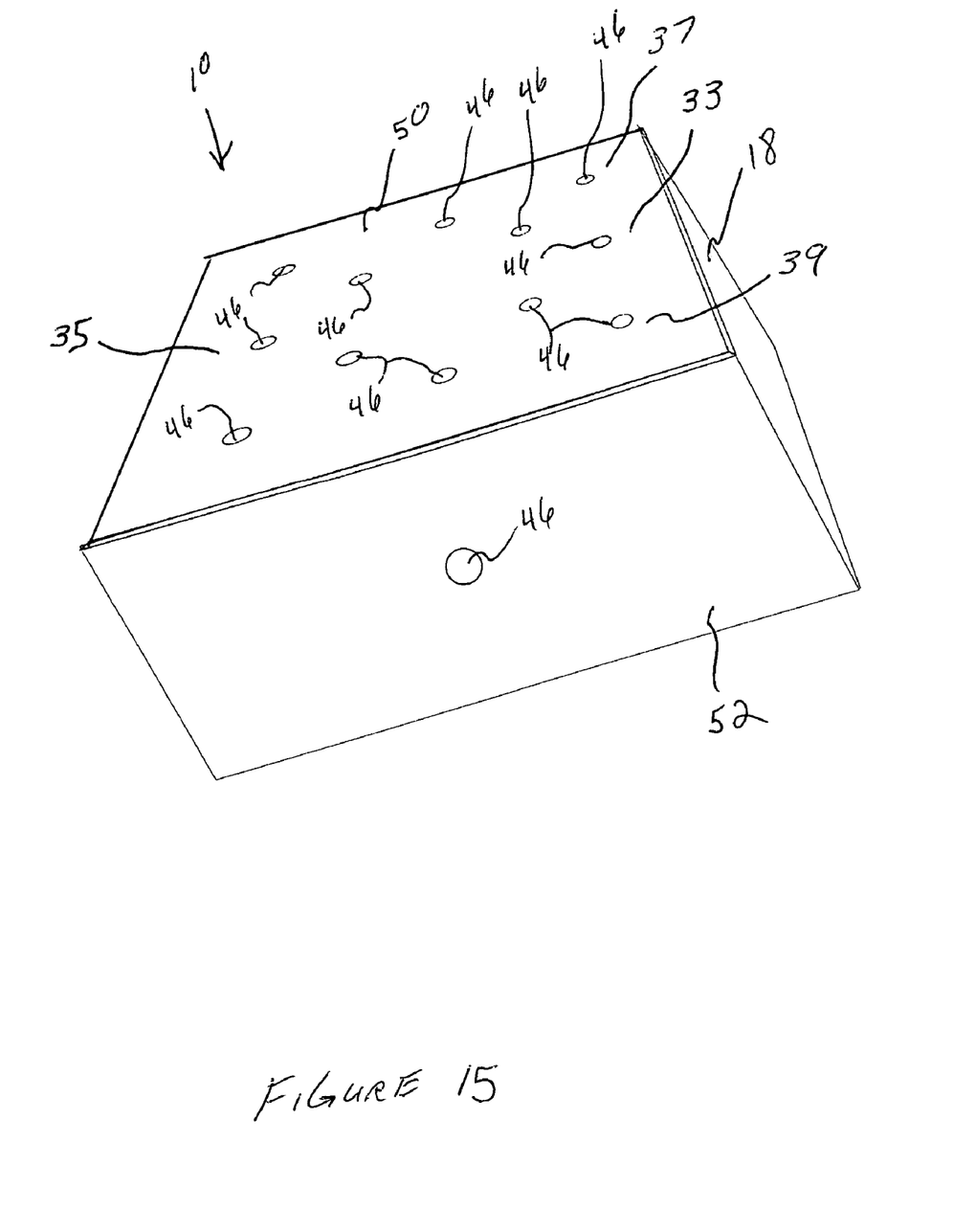
FIG. 15 is a perspective view of the flower holder of FIGS. 8 and 9 in accordance with the present invention.

FIGS. 1-3 are elevations views of preselected configurations for the flower arrangement 26. FIG. 1 is a front elevation view of a triangle pattern with letters 30 and numbers 32 thereupon. The letters 30 (A-F) provide the proximate disposition for six preselected primary flowers 14, after cutting the stems 22 for each primary flower 14 to a predetermined length as determined by the letter 30 and neck line 34 upon the flower chart 12. The primary flowers 14 are orientated substantially vertical via vertical insertion of the end portions 20 of the stems 22 into the flower holder 18, such that flower "A" is centrally disposed in a back portion 33 of the flower holder 18 and flower "F" is centrally disposed in a front portion 35 of the flower holder 18 (see FIGS. 8 and 15). The insertion of the end portions 20 of the primary flowers (A-F) into the recesses 46 in the top wall 50 of the flower holder 18 corresponds to the letter designations (A-F) on the front surface 54 of the template 24 adjacent to the protuberances 44. The primary flowers 14 are generally selected from the group consisting of Roses, Carnations, Orchids and combinations thereof.

The numbers 32 (1-6) in FIG. 1 provide the proximate disposition for six preselected secondary flowers 16, after cutting stems 22 for each secondary flower 16 to a predetermined length as determined by the number 32 and neck line 34 upon the flower chart 12. The secondary flower 14 are angularly orientated via angular insertion of the end portions 20 of the stems 22 into the flower holder 18, such that flower "1" is disposed in a left-back portion 37 of the flower holder 18, and flower "2" is disposed in a right-back portion 39 of the flower holder 18 (see FIGS. 8 and 15). The insertion of the end portions 20 of the secondary flowers (1-6) into the recesses 46 in the top wall 50 of the flower holder 18 corresponds to the number designations (1-6) on the front surface 54 of the template 24 adjacent to the protuberances 44. The secondary flowers 16 are generally selected from the group consisting of Asters, Solid Diegos, Snap Dragons, Baby Breath and combinations thereof.

In operation, a person determines the location for a flower arrangement 26, and a cooperating size for the flower arrangement 26 at the predetermined location. The person then selects a flower chart 12 having a longitudinal dimension that corresponds to flower stem 22 lengths for selected primary and secondary flowers 14 and 16 that will ultimately configure the flower arrangement 26. The selected primary flower 14 is generally the favorite flower of the person configuring the flower arrangement 26. The selected secondary flower 16 is the "filler" flower that best cooperates with the primary flower 14 to configure an optimal or "artistic" flower arrangement 26. The person then selects a flower holder 18 having sufficient mass and rigidity to support the size and weight of the selected primary and secondary flowers 14 and 16. Next, the person selects a pattern for the flower arrangement 26 and a cooperating stem template 24 that forms recesses 46 in the flower holder 18 to mark the insertion locations for end portions 20 of flower stems 22. The end portions 20 are manually urged into the flower holder 18 a distance sufficient to support the primary and secondary flowers 14 and 16 via the end portions 20, irrespective of primary and secondary flower 14 and 16 orientation.

For example, assume that a flower arrangement 26 is required for a room in a person's home. Further, assume that the person's favorite or primary flower 14 is a rose, that the selected filler or secondary flower 16 is a snap dragon, and that a "triangle" pattern (see FIG. 1) is the selected configuration for the flower arrangement 26. A flower chart 12 is selected with stem 22 lengths depicted thereupon that ultimately size a flower arrangement 26 to cooperate with the size of selected room. The flower chart 12 is disposed planar to allow a first rose 14 to be positioned upon the flower chart 12 such that a neck line 42 of the rose 14 is aligned with the neck line 34 depicted on the flower chart 12 under the flower design 28 marked "A." The end of the stem 22 of the rose 14 is cut to align with a cut line 38 depicted upon the flower chart 12, thereby providing a rose 14 having a stem 22 length equal to the stem length between the neck line 34 of the "A" flower design 28 and the cut line 38 on the flower chart 12.

A triangle pattern stem template 24 having front and back surfaces 54 and 56 with protuberances 44 extending from each surface, forms recesses 46 in the flower holder 18. The front surface 54 is urged upon a top wall 50 of the flower holder 18, and the back surface 56 is urged upon a side wall 52 of the flower holder 18. The first rose 14 is then vertically inserted into the flower holder 18 at position "A" as depicted in FIGS. 1, 5, 8 and 15. The same cutting and insertion steps are duplicated for roses "B-F" resulting in smaller stem 22 lengths for each rose, and different insertion locations for corresponding end portions 20 into the flower holder 18 (see FIGS. 1, 5, 7-9, and 15). For a round pattern stem template 24, the same procedure would be followed, but with reference being made to FIGS. 2, 3, 10, and 12-14. Although six flower designs 28 with letters 30 corresponding to the primary flowers 14 are depicted on the flower chart 12, flower arrangement 26 (FIG. 1) and template 24 (FIG. 5), additional or fewer flower designs 28 and letters 30 may be included thereupon.

Next, the snap dragons 16 are sized, then inserted into the flower holder 18. A first snap dragon 16 is disposed upon the flower chart 12 such that a neck line 42 of the snap dragon 16 is aligned with the neck line 34 depicted on the flower chart 12 under the flower design 28 and marked "1" (the flower design 28 also being marked "B"). The end of the stem 22 of the snap dragon is cut to align with the cut line 38, thereby providing a first snap dragon having a stem 22 length equal to the stem length between the neck line 34 of the "1" (or B) flower design 28 and cut line 38, resulting in the stems 22 of the first snap dragon 16 and the second rose 14 being equal in length. The first snap dragon 16 is then angularly inserted into the flower holder 18 at position "1" as depicted in FIGS. 1, 5, 8, and 15. The same cutting and insertion steps are duplicated for snap dragons "2-6" resulting in smaller stem 22 lengths for each snap dragon (snap dragons 5 and 6 are of equal length), and different insertion locations for corresponding end portions 20 into the flower holder 18 (see FIGS. 1, 5, 8 and 15). Although six numbers 32 are depicted on the flower chart 12, flower arrangement 26 (FIG. 1) and template 24 (FIG. 5), additional or fewer numbers may be included thereupon. After configuring the flower arrangement 26 with roses 14 and snap dragons 16 into a triangular pattern, the user disposes the flower holder 18 and the primary and secondary flowers 14 and 16 secured therein into a vase or similar display vessel 48.

The foregoing description is for purposes of illustration only and is not intended to limit the scope of protection accorded this invention. The scope of protection is to be measured by the following claims, which should be interpreted as broadly as the inventive contribution permits.

The invention claimed is:
1. A method for arranging flowers, said method comprising the steps of:
selecting the size of a flower arrangement;
selecting primary flowers for said flower arrangement;

providing secondary flowers for said flower arrangement, said secondary flowers cooperating with said primary flowers to configure said flower arrangement;

providing flower measuring means for determining stem lengths for said primary and secondary flowers;

providing a flower holder for said primary and secondary flowers; providing a removable flower pattern member having a plurality of indicators corresponding to the flower arrangement imprinting the plurality of indicators onto said flower holder for receipt of end portions of stems of said primary and secondary flowers; removing said removable flower pattern member from said flower holder;

inserting said end portions of said stems of said primary and secondary flowers into said imprinted flower holder via corresponding indicators of said removable flower pattern member, whereby said primary and secondary flowers are disposed to configure a predetermined flower arrangement.

2. The method of claim 1 wherein said step of selecting the size of a flower arrangement includes the step of predetermining the location for said flower arrangement.

3. The method of claim 1 wherein said step of selecting primary flowers includes the step of selecting flowers from the group consisting of roses, carnations, orchids and combinations thereof.

4. The method of claim 1 wherein the step of providing secondary flowers includes the step of selecting flowers from the group consisting of Aster, Solid Diego, Snap Dragons, Baby Breath, Ruskus and combinations thereof.

5. The method of claim 1 wherein said step of providing flower measuring means includes the step of providing a neck line for each primary and secondary flower.

6. The method of claim 1 wherein said step of providing flower measuring means includes the step of providing a cut line for each primary and secondary flower.

7. The method of claim 1 wherein said step of providing a flower holder includes the step of providing Styrofoam.

8. The method of claim 1 wherein said step of marking portions of said flower holder via a removable flower pattern member includes the step of providing a flower pattern member with letter and number depictions thereupon.

9. The method of claim 8 wherein said step of providing a flower pattern member includes protuberances that ultimately penetrate the surface of said flower holder, thereby marking insertion locations upon said flower holder for said end portions of said primary and secondary flower stems, and allowing said flower pattern member to be removed from said flower holder.

10. The method of claim 1 wherein the step of inserting said end portions of said stems of said primary and secondary flowers includes the step of inserting said end portions into said flower holder a predetermined distance.

11. The method of claim 9 wherein said step of providing protuberances includes the step of providing primary flower end portion insertion orientation into recesses in said flower holder via letters displayed upon a surface of said flower pattern member, said letters being disposed adjacent to corresponding protuberances that form said recesses, each of said recesses ultimately receiving a corresponding primary flower determined by a cooperating letter disposed adjacent to a respective protuberance.

12. The method of claim 9 wherein said step of providing protuberances includes the step of providing secondary flower end portion insertion orientation into recesses in said flower holder via numbers displayed upon a surface of said flower pattern member, said numbers being disposed adjacent to corresponding protuberances that form said recesses, each of said recesses ultimately receiving a corresponding secondary flower determined by a cooperating number disposed adjacent to a respective protuberance.

* * * * *